United States Patent
Foladare et al.

(10) Patent No.: US 7,911,968 B1
(45) Date of Patent: *Mar. 22, 2011

(54) METHOD AND SYSTEM FOR DYNAMICALLY ADJUSTING QOS

(75) Inventors: Mark Foladare, East Brunswick, NJ (US); Larry Arnise Russell, Atlantic Highlands, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/171,444

(22) Filed: Jul. 11, 2008

Related U.S. Application Data

(63) Continuation of application No. 10/732,750, filed on Dec. 10, 2003, now Pat. No. 7,403,487.

(60) Provisional application No. 60/461,908, filed on Apr. 10, 2003.

(51) Int. Cl.
H04L 12/26 (2006.01)

(52) U.S. Cl. ...................................................... 370/252

(58) Field of Classification Search .................. 370/202, 370/521; 379/88.09, 88.1, 93.08; 380/269; 381/106
See application file for complete search history.

(56) References Cited

U.S. PATENT DOCUMENTS

| | | | |
|---|---|---|---|
| 7,512,118 B1* | 3/2009 | Stephens | 370/352 |
| 7,535,900 B2* | 5/2009 | Shenoi | 370/389 |
| 2003/0152032 A1* | 8/2003 | Yanagihara et al. | 370/236.1 |
| 2004/0185786 A1* | 9/2004 | Mirbaha et al. | 455/67.11 |
| 2005/0025064 A1* | 2/2005 | Chang et al. | 370/252 |
| 2006/0244840 A1* | 11/2006 | Eshet et al. | 348/222.1 |
| 2007/0206671 A1* | 9/2007 | Eshet et al. | 375/240.01 |

* cited by examiner

*Primary Examiner* — Thai D Hoang
(74) *Attorney, Agent, or Firm* — Ed Guntin; Guntin Meles & Gust, PLC

(57) ABSTRACT

Certain exemplary embodiments provide a method, comprising: for each of a plurality of subscribed services associated with a subscriber endpoint in a communications network, for a connection associated with the subscribed service: determining a current QOS metric; and utilizing the current QOS metric and historical QOS metrics for the subscribed service, adjusting a QOS-affecting variable to change a future QOS metric.

21 Claims, 3 Drawing Sheets

METHOD AND SYSTEM FOR DYNAMICALLY ADJUSTING QOS

CROSS-REFERENCES TO RELATED APPLICATIONS

This application is a continuation of, claims priority to, and incorporates by reference herein in its entirety U.S. patent application Ser. No. 10/732,750, filed 10 Dec. 2003, which claims priority to U.S. Provisional Patent Application No. 60/461,908, filed 10 Apr. 2003.

BACKGROUND

U.S. Pat. No. 6,335,927 (Elliott), which is incorporated by reference herein in its entirety, allegedly cites that "[t]elephone calls, data and other multimedia information is routed through a hybrid network which includes transfer of information across the internet. A media order entry captures complete user profile information for a user. This profile information is utilized by the system throughout the media experience for routing, billing, monitoring, reporting and other media control functions. Users can manage more aspects of a network than previously possible, and control network activities from a central site. The hybrid network also contains logic for responding to requests for quality of service and reserving the resources to provide the requested services." See Abstract.

U.S. Pat. No. 6,343,313 (Salesky), which is incorporated by reference herein in its entirety, allegedly cites an "improved networked computer communications system handles arbitrary streams of data, and transports at varying speeds those streams where intermediate updates can be dropped if they are obsoleted by later arriving data updates, optimizing the utilization of network and node resources. Complex buffering by system server software allows distributed, parallel, or redundant processing, transmission, and storage for performance, reliability, and robustness. Various parameters of the system can be monitored, and the system can be reconfigured automatically based on the observations. Varied techniques reduce the perceived end-to-end latency and take advantage of software and hardware capabilities that assets connected to the system may possess. One conferencing system allows conference participants to share all or a portion of the display seen on their computer screens. The conferees may be at sites removed from each other, or may view a recorded presentation or archived conference at different times. Conference participants are either "presenters" who can modify the display or "attendees" who cannot modify the display. A pointer icon, which can be labeled to identify the conferee, is displayed on the shared image area. Each conferee can modify the position of his or her own pointer, even when not presenting, so that every participant can see what each conferee is pointing to, should a conferee choose to point to an element of the display. These and other features apply to other data streams shared in the conference or in meetings where there is no shared-image data stream." See Abstract.

U.S. Pat. No. 6,049,694 (Kassatly), which is incorporated by reference herein in its entirety, allegedly cites a "terminal for use in a multi-point video conference system that includes a plurality of terminals connected to each other via a network, the terminal includes a compressor for packetizing video data inputted from a video camera, and outputting packetized data to the network. A decompressor receives a plurality of packets transmitted from other terminals via the network in a time sharing manner, and decompresses the received packets in an order of reception. The decompressor outputs decompressed video information. A plurality of storage elements store the decompressed video information in a frame unit. The contents stored in the storage elements are displayed on a display. A switch changes over the contents of the storage elements to supply the display." See Abstract.

BRIEF DESCRIPTION OF THE DRAWINGS

A wide variety of potential embodiments will be more readily understood through the following detailed description, with reference to the accompanying drawings in which.

SUMMARY

Figure 1:
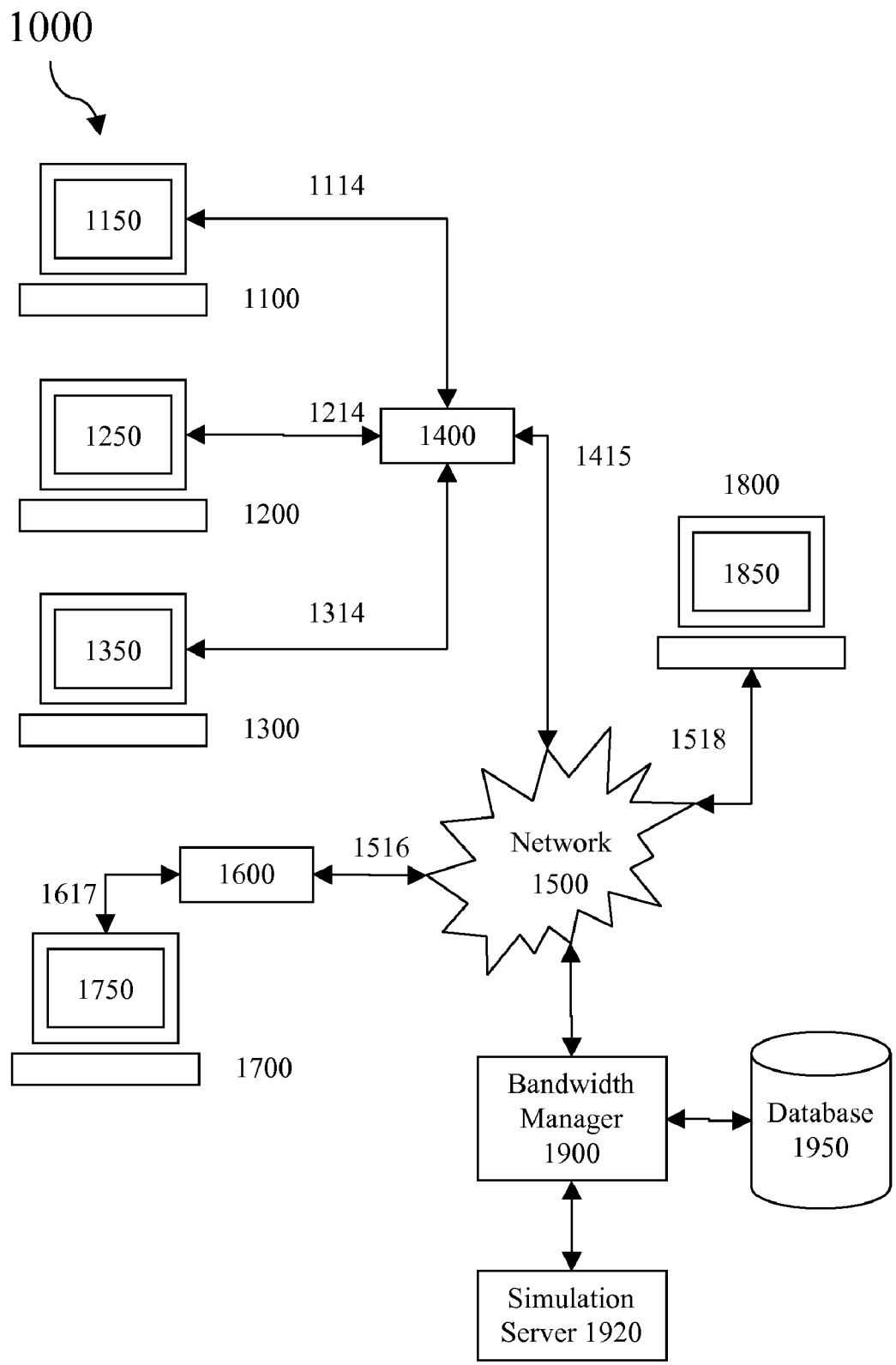
FIG. 1 is a block diagram of an exemplary embodiment of a system 1000.

Certain exemplary embodiments provide a method, comprising: for each of a plurality of subscribed services associated with a subscriber endpoint in a communications network, for a connection associated with the subscribed service: determining a current QOS metric; and utilizing the current QOS metric and historical QOS metrics for the subscribed service, adjusting a QOS-affecting variable to change a future QOS metric.

DEFINITIONS

When the following terms are used herein, the accompanying definitions apply:

subscribed—selected and/or authorized.
service—an activity provided for the benefit of another.
subscriber endpoint—and originating and/or terminating information device.
communications network—a communicatively-coupled plurality of information devices.
wired—utilizing a wire, cable, cord, and/or optical fiber.
connection—a link between two or more points in a communications network.
quality of service (QOS)—a performance measure for a network-based service.
QOS metric—a measured value that relates to QOS. Examples include sound clarity, sound fidelity, voice quality, video picture quality, video picture movement, video frame rate, response time, error rate, etc.
QOS-affecting variable—a parameter, the variation of which impacts QOS. Examples include a compression algorithm, a transmission rate, and/or an encoding scheme.
historical—past.
compression method—a technique for converting data to a format that requires less space than usual. Data compression can be useful in communications because it can enable an information device to transmit the same amount of data in fewer bits.
automatically—acting or operating in a manner essentially independent of external influence or control. For example, an automatic light switch can turn on upon "seeing" a person in its view, without the person manually operating the light switch.
populating—the act of supplying with data.
database—a collection of information organized in such a way that a computer program can quickly select desired pieces of data.

subscriber—one who has selected and/or been authorized to receive a service.

selected—a chosen item.

Dynamic Performance Algorithm—an algorithm that, for each of a plurality of currently-running network-utilizing applications, applies a modeling technique (e.g. linear and/or non-linear regression) to one or more historical QOS metrics to determine a value of a QOS-affecting variable selected based upon a requirement for the application and/or a current QOS for a connection utilized by the application.

optimization—the process used to make a system or design as effective or functional as possible, especially the mathematical techniques involved. For example, optimization can include meeting the absolute requirements for each application to perform with minimal performance and then enhancing performance in order of variable criteria for each application (e.g., video picture quality, video picture movement, voice quality, response time, etc.), understanding that different applications have different importance levels on various variables.

identification—evidence of identity; something that identifies a person or thing.

multimedia—an integrated combination of any two of the following: text, graphics, video, animation, and sound.

multimedia conference service—a network-oriented service utilizing multimedia for facilitating a meeting of geographically-dispersed participants. An example is a videoconference.

bandwidth—The amount of data that can be transmitted in a fixed amount of time. For digital information devices, bandwidth is typically measured in bits per unit of time, such as bits per second (bps).

DETAILED DESCRIPTION

Certain network-utilizing applications, such as streaming video and/or video telephony, require greater bandwidth than others. However, certain access mechanisms, such as cable, DSL, dial-up, etc., can have limited available bandwidth. Compression can provide limited yet poorer quality network access to the application. Coordination can help an application work across multiple access mechanism types having different bandwidths.

In certain exemplary embodiments, for different connections to various projected endpoints, a network-based Bandwidth Manager can track and store in a database historical and/or current quality-of-service (QOS) data, such as the bandwidths, and/or can choose compression methods ideal for each endpoint. That way, all endpoints can, for example, see a videoconference, although some endpoints might have more compressed video than others, and a few endpoints, such as dial-up connected endpoints, might have to settle for voice plus still pictures.

In certain exemplary embodiments, the Bandwidth Manager can allow different endpoints with different access speeds and compression rates and/or algorithms to view the same multimedia conference without reducing the QOS of the conferees that have higher speed access.

Certain exemplary embodiments can include a database comprising 1) access points, 2) list of services subscribed to, and/or 3) compression methods recommended for each service for each access point. For a particular application, the subscriber can identify their endpoint, the network can identify it, and/or the Bandwidth Manager can determine it. This can be followed by application of Dynamic Performance Algorithms, which can change the compression and/or sampling rates in real time based upon network, connection, and/or link performance in real time. The Bandwidth Manager can instruct an application server to provide functionality modified based upon available bandwidth. The Bandwidth Manager can provide access point requirements to, for instance a conferencing or media service. Included within the potential border elements can be a VoIP circuit gateway with circuit endpoints behind it. When the circuit person gets added on or dials in, they can be automatically set to G.711 voice only (or whatever the gateway wants) so they can listen in over a circuit phone.

In certain exemplary embodiments, the network-based Bandwidth Manager collects performance data on various applications that the end user may be running in various combinations. In a simplified example, assume I am talking to you on a VoIP line and data, such as Quality of Service (QOS) data, is being collected by the network-based Bandwidth Manager, stored in a database, and utilized by the Bandwidth Manager and/or a Simulation Server in a model to optimize sound clarity based upon only the one application running at that time. The model can use statistical techniques, such as regression, to determine the required future bandwidth of the VoIP service based upon historical data of network conditions.

As another example, let us assume that suddenly while we are talking, my daughter begins playing a video game with her friend over the net. There are now two applications running over my cable or DSL modem, which functions as an access point to the network. Using various regression techniques based upon data collected when the applications previously ran independently and/or together, the optimization model for compression and/or bit rate can be applied to each application. When I or my daughter ends our use of the access point, the model can be re-run and rates adjusted again. In order to gain better data to develop the models, historical data for similar applications at similar access points can be aggregated to build more robust models for application interaction in various environments.

Thus, certain exemplary embodiments can provide dynamically variable QOS, via variable compression and/or bit rate, to multiple applications concurrently accessing a network.

FIG. 1 is a block diagram of an exemplary embodiment of a system 1000, which can comprise a plurality of information devices, such as subscriber information devices 1100, 1200, 1300, 1800, and/or at least one application server 1700. On any subscriber information device 1100, 1200, 1300, 1800 can run one or more subscribed services 1100, 1200, 1350, 1850. Via an access point 1400, such as a modem, router, gateway, etc., subscriber information devices 1100, 1200, 1300 can be coupled to a network 1500. Subscriber information device 1800 can be directly coupled to network 1500. Via an access point 1600, a server 1700 can be coupled to network 1500. On any server 1700 can run a server application, such as an application for serving e-mail, documents, web pages, faxes, chat, streaming video, streaming audio, voice-mail, video-mail, voice conferencing, video-conferencing, and/or multi-media conferencing, etc. Network 1500 can be a wired and/or wireless connection and/or communication network, such as for example, a public, private, circuit-switched, packet-switched, connection-less, virtual, radio, telephone, POTS, non-POTS, PSTN, non-PSTN, cellular, cable, DSL, satellite, microwave, AC power, twisted pair, IEEE 802.03, Ethernet, token ring, local area, wide area, IP, Internet, intranet, wireless, Ultra Wide Band (UWB), Wi-Fi, BlueTooth, Airport, IEEE 802.11a, IEEE 802.11b, IEEE 802.11g, X-10, and/or electrical power network, etc., and/or any equivalents or thereof.

Any subscriber information device 1100, 1200, 1300, 1800 can function as a subscriber endpoint on a wired or wireless connection formed between two or more information devices. For example, a wired connection can be formed between information device 1100 and information device 1800, that wired connection having a plurality of links 1114, 1415, one or more links within network 1500, and link 1518, at least one of those links being a wired link. A different wired connection can be formed between information device 1700 and information device 1800, that wired connection having a plurality of links 1617, 1516, one or more links within public network 1500, and link 1518.

Also coupled to network 1500 can be a Bandwidth Manager 1900, to which a Simulation Server 1920 and/or a database 1950 is coupled. Bandwidth manager 1900 and/or Simulation Server 1920 can be an information device. Bandwidth Manager 1900 can receive, obtain, determine, and/or collect an identification of each of a plurality of subscriber endpoints in a communications network. For each of the subscriber endpoints, Bandwidth Manager 1900 receive, obtain, determine, and/or collect an identification of a subscribed service, such as a multimedia conference service and/or an identification of a bandwidth of a potential connection to the subscriber endpoint involving the subscribed service. For each potential connection, Bandwidth Manager 1900 receive, obtain, determine, and/or collect an identification of a QOS-affecting variable, such as a compression method, transmission rate, bandwidth, etc. Bandwidth Manager 1900 can automatically populate database 1950 with the identification of the subscriber endpoint, the subscribed multimedia conference service, the potential connection bandwidth, and/or the QOS-affecting variable of each potential connection.

Bandwidth Manager 1900 can monitor a connection. Bandwidth manager 1900 can obtain, receive, and/or collect current data and/or historical data, such as Quality of Service (QOS) data, that relates to the subscribed service, the subscriber, the access point, the connection, and/or a link of the connection. QOS data can include a QOS metric and/or a QOS-affecting variable.

Bandwidth Manager 1900 can store current data and/or historical data in database 1950. Bandwidth Manager 1900 and/or Simulation Server 1920 can access database 1950 and/or other data sources to obtain current data and/or historical data.

Simulation Server 1920 can analyze the current data and/or historical data. The analysis can include modeling future data based on the current and/or historical data. For example, one or more future QOS metrics can be estimated based on one or more current QOS metrics and/or one or more historical QOS metrics. This modeling can include modeling one or more future QOS metrics based on varying a QOS-affecting variable.

Based on the results of the analysis performed by Simulation Server 1920, the Bandwidth Manager can adjust a predetermined QOS-affecting variable and thereby change a future QOS metric.

A wide variety of analytical techniques can be applied to current and/or historical data, such as, for example, probability analyses (e.g., a priori probabilities, conditional probabilities, and/or posteriori probabilities, etc.), distribution analysis, sampling theory, classification analysis (e.g., Bayesian Decision Theory, parametric techniques (such as Bayesian estimation, maximum likelihood estimation, and/or Markov models, etc.), nonparametric techniques (such as Parzen windows, nearest neighbor, etc.), linear discriminant techniques, neural networks, stochastic methods, nonmetric methods, algorithm-independent machine learning, and/or unsupervised learning and/or clustering), correlation theory and/or analysis (e.g., curve fitting, regression, multiple correlation, and/or partial correlation, etc.), analysis of variance, analysis of time series (e.g., smoothing, moving averages, trend estimation, estimation of seasonal variations and/or seasonal index, deseasonalization, estimate of cyclic variations, and/or estimate of irregular variations, etc.), forecasting, queuing theory, decision theory, and/or information theory.

For example, Simulation Server 1920 can analyze current and/or historical data to determine, for example, patterns and/or dependencies, such as how changes in values of a variable affects QOS metrics such as sound clarity, sound fidelity, voice quality, video picture quality, video picture movement, video frame rate, response time, and/or error rate, etc. Based on the analysis of Simulation Server 1920, QOS can be improved and/or optimized.

Figure 2:
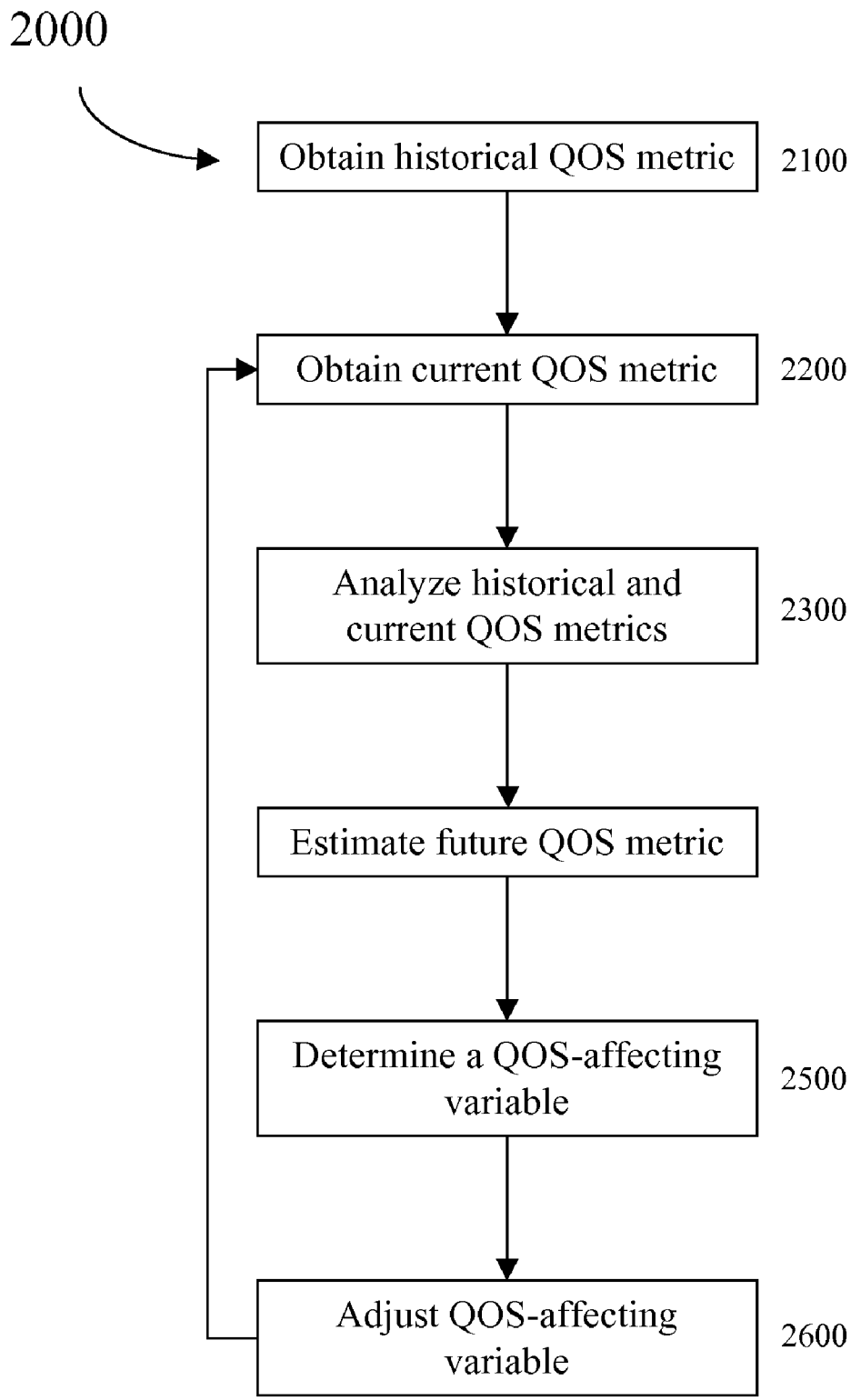
FIG. 2 is a flow diagram of an exemplary embodiment of a method 2000.

FIG. 2 is a flow diagram of an exemplary embodiment of a method 2000. At activity 2100, one or more historical QOS metrics can be obtained. At activity 2200, one or more current QOS metrics can be obtained. At activity 2300, the historical and/or current QOS metrics can be analyzed. At activity 2400, one or more future QOS metrics can be estimated. At activity 2500, a QOS-affecting variable can be determined. At activity 2600, the QOS-affecting variable can be adjusted. Any of activities 2100, 2200, 2300, 2400, 2500, and/or 2600 can be repeated throughout the duration of a connection, and/or as long as an access point is being utilized by a subscribed service.

Figure 3:
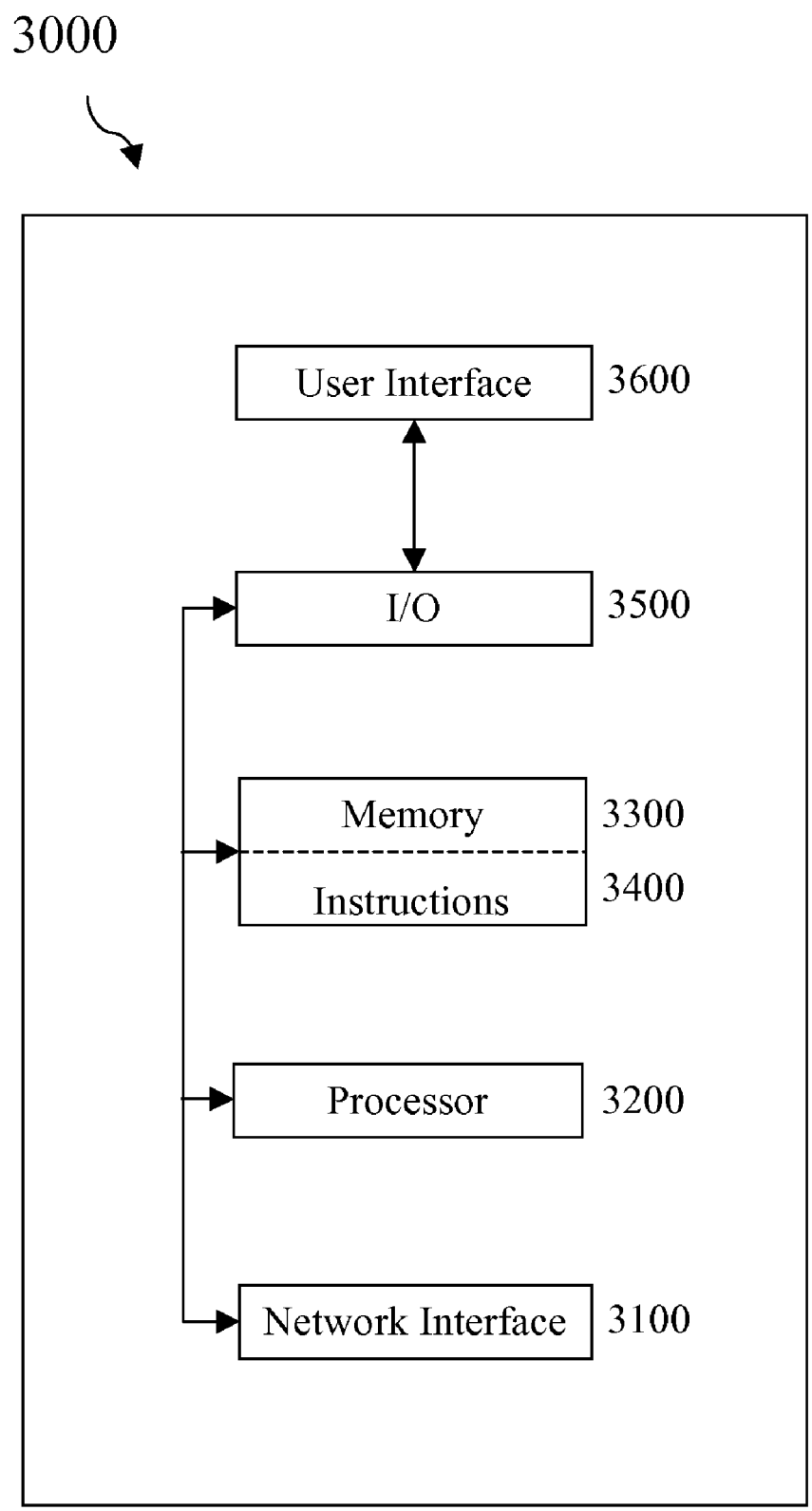
FIG. 3 is a block diagram of an exemplary embodiment of an information device 3000.

FIG. 3 is a block diagram of an exemplary embodiment of an information device 3000, which can represent any of information devices 1100, 1200, 1300, 1700, 1800, and/or 1900 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage, such as for example, a nonvolatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
   at a bandwidth manager communicatively coupled to a communications network, for each of a plurality of subscribed services associated with a subscriber endpoint in the communications network, for a wired connection associated with the subscribed service, causing a transmission of information in accordance with a Quality of Service (QOS) metric, the QOS metric determined based upon a statistical regression of at least one of a plurality of historical QOS metrics, the bandwidth manager adapted to choose a compression method for each of the plurality of subscribed services based upon the QOS metric, the bandwidth manager adapted to change a compression method for each of the plurality of subscribed services based upon the QOS metric.

2. The method of claim 1, further comprising:
causing a multimedia conference to be viewed at the subscriber endpoint, the multimedia conference one of the plurality of subscribed services, video of the multimedia conference provided to the subscriber endpoint, the video compressed at a compression rate, the multimedia conference provided with still pictures to a second endpoint, the still pictures provided responsive to an automatic determination that the second endpoint is connected to the multimedia conference via a connection that lacks sufficient bandwidth to receive the video of the multimedia conference at the compression rate.

3. The method of claim 1, further comprising:
based on the QOS metric and historical QOS metrics for the subscribed service, adjusting a QOS-affecting variable to change a future QOS metric.

4. The method of claim 1, further comprising:
determining the historical QOS metrics.

5. The method of claim 1, further comprising:
performing the statistical regression.

6. The method of claim 1, further comprising:
estimating a future QOS metric based upon a second statistical regression of the historical QOS metrics and the QOS metric.

7. The method of claim 1, further comprising:
determining a QOS-affecting variable of the QOS metric, the statistical regression adapted to cause a change in the QOS-affecting variable.

8. The method of claim 1, further comprising:
determining an adjustment to a QOS-affecting variable, the statistical regression adapted to cause a change a future QOS metric via the QOS-affecting variable.

9. The method of claim 1, wherein:
the QOS metric fulfills a requirement of the subscribed service.

10. The method of claim 1, wherein:
the bandwidth manager is adapted to allow different endpoints with different access speeds to view a multimedia conference without reducing a QOS of conferees with high access speeds.

11. The method of claim 1, wherein:
a QOS-affecting variable is compression algorithm, the statistical regression adapted to cause a change in the QOS-affecting variable.

12. The method of claim 1, wherein:
a QOS-affecting variable is transmission rate, the statistical regression adapted to cause a change in the QOS-affecting variable.

13. The method of claim 1, wherein:
the QOS metric is sound clarity.

14. The method of claim 1, wherein:
the QOS metric is sound fidelity.

15. The method of claim 1, wherein:
the QOS metric is voice quality.

16. The method of claim 1, wherein:
the QOS metric is video picture quality.

17. The method of claim 1, wherein:
the QOS metric is video picture movement.

18. The method of claim 1, wherein:
the QOS metric is response time.

19. The method of claim 1, wherein:
the QOS metric is error rate.

20. A computer readable medium comprising computer executable instructions for performing activities comprising:
at a bandwidth manager communicatively coupled to a communications network, for each of a plurality of subscribed services associated with a subscriber endpoint in the communications network, for a wired connection associated with the subscribed service, causing a transmission of information in accordance with a Quality of Service (QOS) metric, the QOS metric determined based upon a statistical regression of at least one of a plurality of historical QOS metrics, the bandwidth manager adapted to choose a compression method for each of the plurality of subscribed services based upon the QOS metric.

21. A method, comprising:
at a bandwidth manager communicatively coupled to a communications network, for each of a plurality of subscribed services associated with a subscriber endpoint in the communications network, for a wired connection associated with the subscribed service, causing a transmission of information in accordance with a Quality of Service (QOS) metric, the QOS metric determined based upon a statistical regression of at least one of a plurality of historical QOS metrics, the bandwidth manager adapted to change a compression method for each of the plurality of subscribed services based upon the QOS metric.

* * * * *